United States Patent
Mongillo et al.

(10) Patent No.: US 10,662,781 B2
(45) Date of Patent: May 26, 2020

(54) GAS TURBINE ENGINE COMPONENT HAVING VASCULAR ENGINEERED LATTICE STRUCTURE

(71) Applicant: United Technologies Corporation, Farmington, CT (US)

(72) Inventors: Dominic J. Mongillo, West Hartford, CT (US); Tracy A. Propheter-Hinckley, Manchester, CT (US); Mark F. Zelesky, Bolton, CT (US); Joel H. Wagner, Wethersfield, CT (US); Thomas N. Slavens, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 116 days.

(21) Appl. No.: 16/048,466

(22) Filed: Jul. 30, 2018

(65) Prior Publication Data
US 2018/0334909 A1  Nov. 22, 2018

Related U.S. Application Data

(63) Continuation of application No. 14/654,676, filed as application No. PCT/US2013/032003 on Mar. 15, 2013, now Pat. No. 10,036,258.
(Continued)

(51) Int. Cl.
*F01D 5/18* (2006.01)
*F01D 11/08* (2006.01)
(Continued)

(52) U.S. Cl.
CPC ............ *F01D 5/186* (2013.01); *B22F 3/1055* (2013.01); *B23P 15/26* (2013.01); *F01D 5/147* (2013.01);
(Continued)

(58) Field of Classification Search
CPC ... F01D 5/147; F01D 5/16; F01D 5/18; F01D 5/181; F01D 5/182; F01D 5/183;
(Continued)

(56) References Cited

U.S. PATENT DOCUMENTS 3,067,982 A * 12/1962 Wheeler, Jr. ............ F01D 5/183
416/90 R
3,584,972 A    6/1971 Bratkovich et al.
(Continued)

FOREIGN PATENT DOCUMENTS

DE        10261071       7/2004
EP         0475658       3/1992
(Continued)

OTHER PUBLICATIONS

International Search Report and Written Opinion for International application No. PCT/US2013/032003 dated Dec. 17, 2013.
(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

A component according to an exemplary aspect of the present disclosure includes, among other things a wall and a vascular engineered lattice structure formed inside of the wall. The vascular engineered lattice structure defines a hollow vascular structure configured to communicate a fluid through the vascular engineered lattice structure. The vascular engineered lattice structure has at least one inlet hole and at least one outlet hole that communicates the fluid into and out of the hollow vascular structure. A method for producing a component is also disclosed.

22 Claims, 6 Drawing Sheets

Related U.S. Application Data

(60) Provisional application No. 61/746,893, filed on Dec. 28, 2012, provisional application No. 61/757,441, filed on Jan. 28, 2013.

(51) Int. Cl.

| | | |
|---|---|---|
| *F01D 25/24* | (2006.01) | |
| *F02C 7/18* | (2006.01) | |
| *F01D 25/12* | (2006.01) | |
| *B22F 3/105* | (2006.01) | |
| *B23P 15/26* | (2006.01) | |
| *F01D 5/14* | (2006.01) | |
| *F01D 9/02* | (2006.01) | |
| *F01D 25/08* | (2006.01) | |
| *B33Y 10/00* | (2015.01) | |
| *B33Y 70/00* | (2020.01) | |
| *B33Y 80/00* | (2015.01) | |

(52) U.S. Cl.
CPC ............... *F01D 5/18* (2013.01); *F01D 5/187* (2013.01); *F01D 9/02* (2013.01); *F01D 11/08* (2013.01); *F01D 25/08* (2013.01); *F01D 25/12* (2013.01); *F01D 25/24* (2013.01); *F02C 7/18* (2013.01); *B33Y 10/00* (2014.12); *B33Y 70/00* (2014.12); *B33Y 80/00* (2014.12); *F05D 2260/204* (2013.01); *F23R 2900/03043* (2013.01); *Y10T 29/49318* (2015.01); *Y10T 29/49337* (2015.01); *Y10T 29/49343* (2015.01); *Y10T 29/49352* (2015.01); *Y10T 428/249921* (2015.04)

(58) Field of Classification Search
CPC .......... F01D 5/184; F01D 5/186; F01D 5/187; F01D 9/02; F01D 25/08; F01D 25/02; F01D 11/08; F05D 2260/202; F05D 2260/203; F05D 2260/204; F05D 2260/205; F05D 2250/185; B22F 3/1055; B23P 15/26; F02C 7/18; Y10T 428/249921; Y10T 29/49343; Y10T 29/49337; Y10T 29/49318; Y10T 29/49352; B33Y 70/00; B33Y 80/00; B33Y 10/00
See application file for complete search history.

(56) References Cited

U.S. PATENT DOCUMENTS

| | | | |
|---|---|---|---|
| 3,810,711 A * | 5/1974 | Emmerson | F01D 5/184 416/97 R |
| 3,864,199 A | 2/1975 | Meginnis | |
| 3,900,629 A | 8/1975 | Spencer | |
| 3,963,368 A * | 6/1976 | Emmerson | F01D 5/184 415/115 |
| 4,004,056 A | 1/1977 | Carroll | |
| 4,091,146 A | 5/1978 | Darrow et al. | |
| 4,168,348 A | 9/1979 | Bhangu et al. | |
| 4,269,032 A | 5/1981 | Meginnis et al. | |
| 4,292,376 A | 9/1981 | Hustler | |
| 4,302,940 A | 12/1981 | Meginnis | |
| 4,359,181 A | 11/1982 | Chisholm | |
| 4,407,632 A | 10/1983 | Lee | |
| 4,440,834 A | 4/1984 | Aubert et al. | |
| 4,751,962 A | 6/1988 | Havekost et al. | |
| 5,193,611 A | 3/1993 | Hesselgreaves | |
| 5,353,867 A | 10/1994 | Jaspers | |
| 5,370,499 A | 12/1994 | Lee | |
| 5,545,003 A | 8/1996 | O'Connor et al. | |
| 5,607,778 A | 3/1997 | Padden | |
| 5,660,523 A | 8/1997 | Lee | |
| 5,752,801 A | 5/1998 | Kennedy | |
| 5,960,863 A | 10/1999 | Hua | |
| 5,975,841 A | 11/1999 | Lindemuth et al. | |
| 6,126,396 A | 10/2000 | Doughty et al. | |
| 6,167,952 B1 | 1/2001 | Downing | |
| 6,235,370 B1 | 5/2001 | Merrill et al. | |
| 6,397,922 B1 | 6/2002 | Sachs et al. | |
| 6,412,541 B2 | 7/2002 | Roesler | |
| 6,508,623 B1 | 1/2003 | Shiozaki et al. | |
| 6,511,762 B1 | 1/2003 | Lee et al. | |
| 6,599,568 B2 | 7/2003 | Lee et al. | |
| 6,617,003 B1 | 9/2003 | Lee et al. | |
| 6,629,559 B2 | 10/2003 | Sachs et al. | |
| 6,761,956 B2 | 7/2004 | Lee et al. | |
| 6,955,523 B2 | 10/2005 | McClelland | |
| 7,048,986 B2 | 5/2006 | Shah et al. | |
| 7,063,131 B2 | 6/2006 | Northrop | |
| 7,070,853 B2 | 7/2006 | Paul | |
| 7,141,812 B2 | 11/2006 | Appleby | |
| 7,144,220 B2 | 12/2006 | Marcin | |
| 7,153,464 B2 | 12/2006 | Millard et al. | |
| 7,204,089 B2 | 4/2007 | Schreiber | |
| 7,294,164 B2 | 11/2007 | Merkel | |
| 7,328,580 B2 | 2/2008 | Lee | |
| 7,402,335 B2 | 7/2008 | Bolms et al. | |
| 7,500,828 B2 | 3/2009 | Landis | |
| 7,540,710 B2 | 6/2009 | Grote et al. | |
| 7,597,533 B1 | 10/2009 | Liang | |
| 7,658,590 B1 | 2/2010 | Spanks | |
| 7,665,956 B2 | 2/2010 | Mitchell | |
| 7,670,675 B2 | 3/2010 | Heselhaus | |
| 7,717,677 B1 | 5/2010 | Liang | |
| 7,775,766 B2 | 8/2010 | Meier et al. | |
| 7,785,098 B1 | 8/2010 | Appleby et al. | |
| 7,810,552 B2 | 10/2010 | Slaughter | |
| 7,866,372 B2 | 1/2011 | Slaughter | |
| 7,866,377 B2 | 1/2011 | Slaughter | |
| 7,968,144 B2 | 6/2011 | James et al. | |
| 8,052,389 B2 | 11/2011 | Kopmels | |
| 8,079,821 B2 | 12/2011 | Campbell et al. | |
| 8,167,573 B2 | 5/2012 | Merrill et al. | |
| 8,257,809 B2 | 9/2012 | Morrison et al. | |
| 8,327,911 B2 | 12/2012 | Kush et al. | |
| 2005/0045306 A1 | 3/2005 | Petervary et al. | |
| 2006/0099074 A1 | 5/2006 | Kopmels | |
| 2006/0251515 A1 | 11/2006 | Landis | |
| 2006/0285975 A1 | 12/2006 | Landis | |
| 2007/0031252 A1 | 2/2007 | Walters et al. | |
| 2007/0214759 A1 | 9/2007 | Merkel | |
| 2007/0243069 A1 | 10/2007 | Read | |
| 2007/0275210 A1 | 11/2007 | Heselhaus | |
| 2008/0080979 A1 | 4/2008 | Brassfield et al. | |
| 2008/0254276 A1 | 10/2008 | James | |
| 2009/0011919 A1 | 1/2009 | Noguchi et al. | |
| 2009/0274549 A1 | 11/2009 | Mitchell et al. | |
| 2010/0011775 A1 | 1/2010 | Garry et al. | |
| 2010/0025001 A1 | 2/2010 | Lee et al. | |
| 2010/0119377 A1 | 5/2010 | Tibbott et al. | |
| 2010/0284798 A1 | 11/2010 | Campbell et al. | |
| 2010/0291401 A1 | 11/2010 | Medina et al. | |
| 2011/0052412 A1 | 3/2011 | Ader et al. | |
| 2011/0180245 A1 | 7/2011 | Obana et al. | |
| 2011/0262695 A1 | 10/2011 | Lee et al. | |
| 2011/0265406 A1 | 11/2011 | Morrison et al. | |
| 2011/0268580 A1 | 11/2011 | Bryk et al. | |
| 2011/0293434 A1 | 12/2011 | Lee et al. | |
| 2012/0006518 A1 | 1/2012 | Lee et al. | |
| 2012/0034075 A1 | 2/2012 | Hsu et al. | |
| 2012/0070306 A1 | 3/2012 | Lee | |
| 2012/0237786 A1 | 9/2012 | Morrison et al. | |
| 2012/0243970 A1 | 9/2012 | Hellgren et al. | |
| 2012/0291991 A1 | 11/2012 | Denkenberger | |
| 2013/0001837 A1 | 1/2013 | Gohler et al. | |

FOREIGN PATENT DOCUMENTS

| | | |
|---|---|---|
| EP | 0896127 | 7/2007 |
| EP | 2199725 | 6/2010 |
| GB | 2284825 | 6/1995 |
| WO | 2003006883 | 1/2003 |

(56) References Cited

FOREIGN PATENT DOCUMENTS

| WO | 2007014005 | 2/2007 |
|----|------------|--------|
| WO | 2011069015 | 6/2011 |
| WO | 2011133359 | 10/2011 |
| WO | 2013013995 | 1/2013 |

OTHER PUBLICATIONS

International Search Report and Written Opinion for International application No. PCT/US2013/032202 dated Jan. 27, 2014.
International Search Report and Written Opinion for International Application No. PCT/US2013/041054 dated Sep. 4, 2013.
Extended European Search Report for European Patent Application No. 13869611 completed Jul. 14, 2016.
Extended European Search Report for European Patent Application No. 13867031 completed Jul. 8, 2016.
International Preliminary Report on Patentablity for International Application No. PCT/US2013/032003 dated Jul. 9, 2015.

\* cited by examiner

GAS TURBINE ENGINE COMPONENT HAVING VASCULAR ENGINEERED LATTICE STRUCTURE

CROSS-REFERENCE TO RELATED APPLICATION

This application is a continuation of U.S. application Ser. No. 14/654,676, filed Jun. 22, 2015, which is a national stage entry of International Application PCT/US13/32003, filed Mar. 15, 2013. International Application PCT/US13/32003 claims priority to U.S. Provisional Application No. 61/746,893, filed on Dec. 28, 2012, and claims priority to U.S. Provisional Application No. 61/757,441, filed on Jan. 28, 2013.

BACKGROUND

This disclosure relates to a gas turbine engine, and more particularly to a gas turbine engine component having an engineered vascular structure.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

A component according to an exemplary aspect of the present disclosure includes, among other things a wall and a vascular engineered lattice structure formed inside of the wall. The vascular engineered lattice structure defines a hollow vascular structure configured to communicate a fluid through the vascular engineered lattice structure. The vascular engineered lattice structure has at least one inlet hole and at least one outlet hole that communicates the fluid into and out of the hollow vascular structure.

In a further non-limiting embodiment of the foregoing component, the hollow vascular structure includes hollow passages that extend through one or more nodes and branches of the vascular engineered lattice structure.

In a further non-limiting embodiment of either of the foregoing components, the one or more nodes and branches are uniformly distributed throughout the vascular engineered lattice structure.

In a further non-limiting embodiment of any of the foregoing components, the one or more nodes and branches are non-uniformly distributed throughout the vascular engineered lattice structure.

In a further non-limiting embodiment of any of the foregoing components, the branches are orthogonal to the nodes.

In a further non-limiting embodiment of any of the foregoing components, the branches are non-orthogonal to the nodes.

In a further non-limiting embodiment of any of the foregoing components, the vascular engineered lattice structure is one of a co-flow vascular engineered lattice structure and a counter-flow vascular engineered lattice structure.

In a further non-limiting embodiment of any of the foregoing components, the outlet hole is a film cooling hole.

In a further non-limiting embodiment of any of the foregoing components, the wall is part of a blade, a vane, a blade outer air seal (BOAS), a combustor panel or a turbine exhaust case liner of a gas turbine engine.

In a further non-limiting embodiment of any of the foregoing components, the at least one inlet hole includes a different shape and geometry from the at least one outlet hole.

A component according to an exemplary aspect of the present disclosure includes, among other things, a wall and a vascular engineered lattice structure formed inside of the wall. The vascular engineered lattice structure defines a solid vascular structure configured to communicate a fluid through the vascular engineered lattice structure. The vascular engineered lattice structure has at least one inlet hole and at least one outlet hole that communicate the fluid into and out of the solid vascular structure.

In a further non-limiting embodiment of the foregoing component, the solid vascular structure includes a plurality of nodes, a plurality of branches that extend between the plurality of nodes, and a plurality of passages extending between the plurality of nodes and the plurality of passages.

In a further non-limiting embodiment of either of the foregoing components, the plurality of nodes and the plurality of branches are uniformly distributed throughout the vascular engineered lattice structure.

In a further non-limiting embodiment of any of the foregoing components, the plurality of nodes and the plurality of branches are non-uniformly distributed throughout the vascular engineered lattice structure.

In a further non-limiting embodiment of any of the foregoing components, the plurality of branches are orthogonal to the plurality of nodes.

In a further non-limiting embodiment of any of the foregoing components, the plurality of branches are non-orthogonal to the plurality of nodes.

In a further non-limiting embodiment of any of the foregoing components, the at least one outlet hole includes a film cooling hole.

In a further non-limiting embodiment of any of the foregoing components, the vascular engineered lattice structure is one of a counter-flow vascular engineered lattice structure and a co-flow vascular engineered lattice structure.

In a further non-limiting embodiment of any of the foregoing components, the wall is part of a blade, a vane or a blade outer air seal (BOAS) of a gas turbine engine.

In a further non-limiting embodiment of any of the foregoing components, the at least one inlet hole includes a different shape and geometry from the at least one outlet hole.

A method for producing a component according to another exemplary aspect of the present disclosure includes, among other things, forming a vascular engineered lattice structure inside of a wall of the component. The vascular engineered lattice structure has at least one of a hollow lattice structure and a solid lattice structure and includes at least one inlet hole and at least one outlet hole that communicate a fluid into and out of the vascular engineered lattice structure.

In a further non-limiting embodiment of the foregoing method, the step of forming the vascular engineered lattice structure includes forming a core using an additive manufacturing process and using the core to cast the vascular engineered lattice structure.

The various features and advantages of this disclosure will become apparent to those skilled in the art from the following detailed description. The drawings that accompany the detailed description can be briefly described as follows.

DETAILED DESCRIPTION

Figure 1:
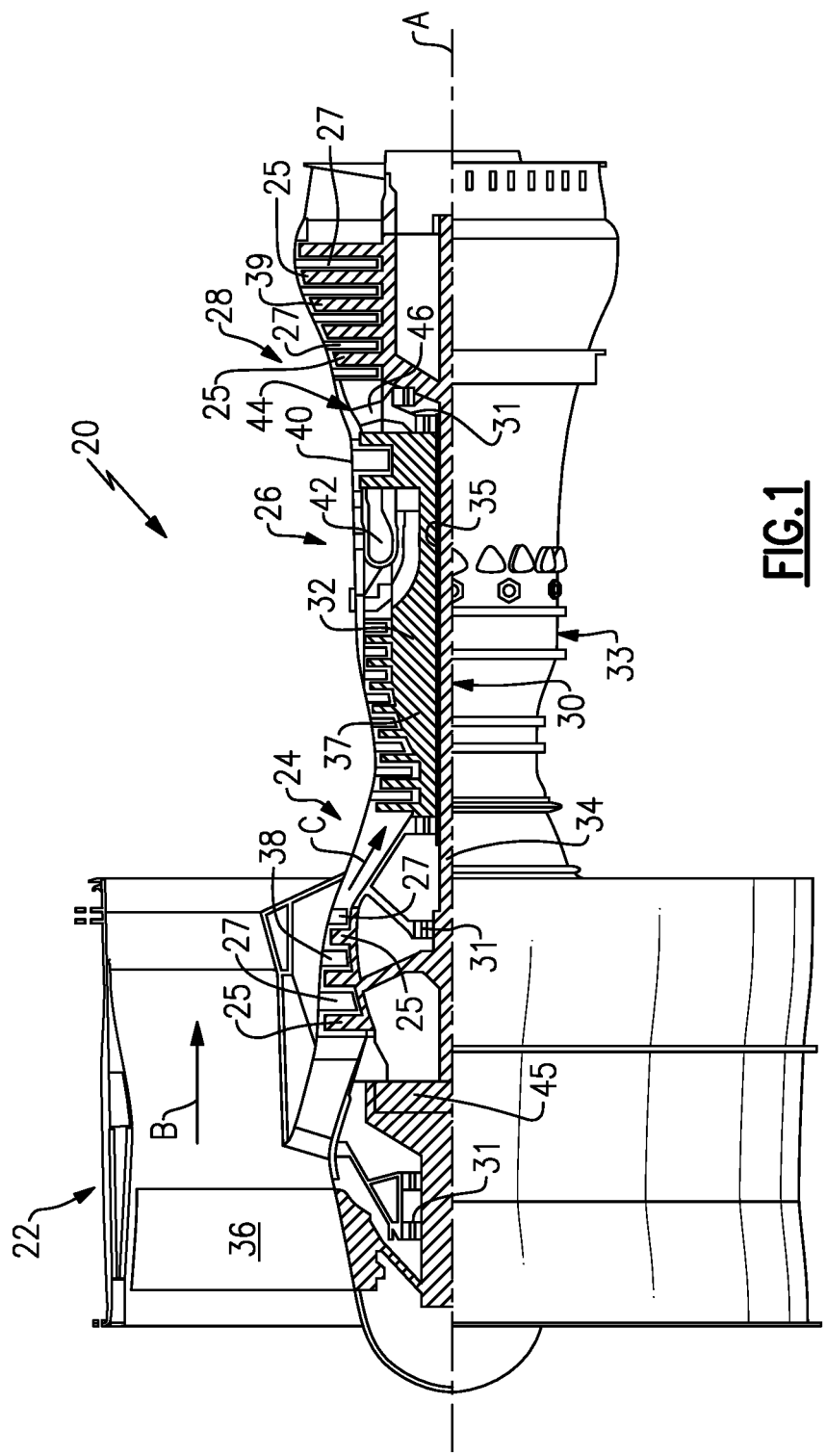
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure relates to gas turbine engine component cooling schemes that include vascular engineered lattice structures inside the walls of the gas turbine engine component. The exemplary structures described herein provide effective localized convective cooling, and is some embodiments, can provide resupply and film cooling for gas turbine engine components that may be subject to the hot combustion gases that are communicated through the core flow path C.

Figure 2:
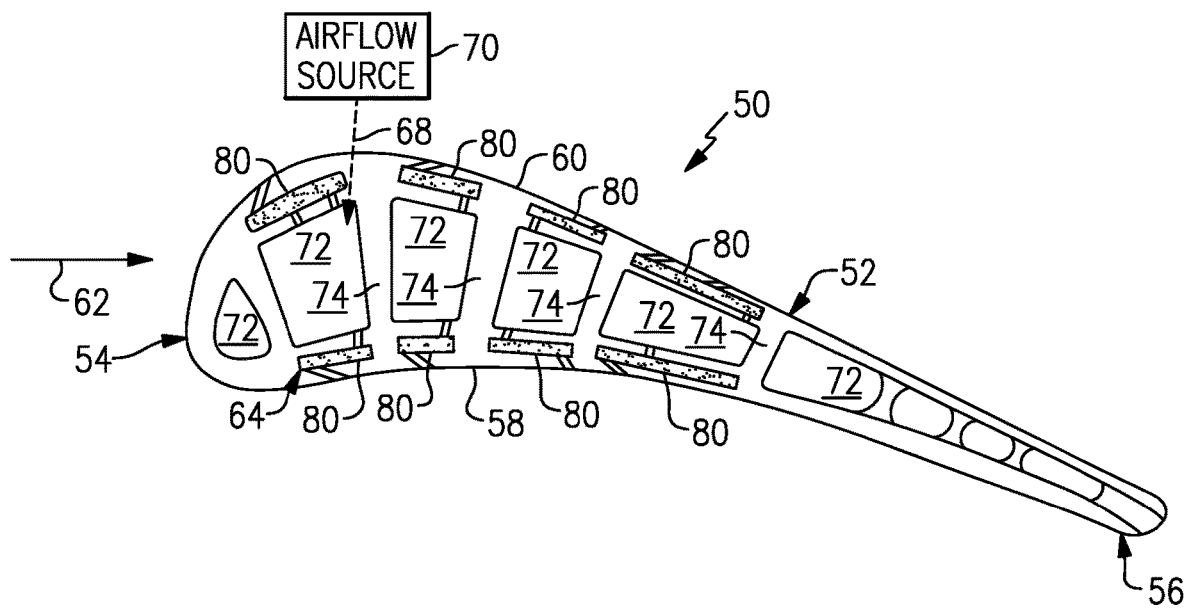
FIG. 2 illustrates a component that can be incorporated into a gas turbine engine.

FIG. 2 illustrates a component 50 that can be incorporated into a gas turbine engine, such as the gas turbine engine 20 of FIG. 1. The component 50 includes a body portion 52 that axially extends between a leading edge portion 54 and a trailing edge portion 56. The body portion 52 may further include a first (pressure) side wall 58 and a second (suction) side wall 60 that are spaced apart from one another and axially extend between the leading edge portion 54 and the trailing edge portion 56. Although shown in cross-section, the body portion 52 would also extend radially across a span.

In this embodiment, the body portion 52 is representative of an airfoil. For example, the body portion 52 could be an airfoil that extends from platform and root portions (i.e., where the component is a blade), or could alternatively extend between inner and outer platforms (i.e., where the component 50 is a vane). In yet another embodiment, the component 50 could include a non-airfoil component, including but not limited to, a blade outer air seal (BOAS), a combustor liner, a turbine exhaust case liner, or any other part that may require dedicated cooling.

A gas path 62 is communicated axially downstream through the gas turbine engine 20 in a direction that extends from the leading edge portion 54 toward the trailing edge portion 56 of the body portion 52. The gas path 62 represents the communication of core airflow along the core flow path C (see FIG. 1).

A cooling scheme 64 may be disposed inside of the body portion 52 for cooling the internal and external surface areas of the component 50. For example, the cooling scheme 64 can include one or more cavities 72 that may radially, axially and/or circumferentially extend inside of the body portion 52 to establish cooling passages for receiving an airflow 68 (or some other fluid). The airflow 68 may be communicated into one or more of the cavities 72 from an airflow source 70 that is external to the component 50 to cool the component 50. In one embodiment, the airflow 68 is communicated to the cooling scheme 64 through a root portion of the component 50 (e.g., where the component is a blade).

The airflow 68 is generally of a lower temperature than the airflow of the gas path 62 that is communicated across the body portion 52. In one particular embodiment, the airflow 68 is a bleed airflow that can be sourced from the compressor section 24 or any other portion of the gas turbine engine 20 that has a lower temperature as compared to the component 50. The airflow 68 can be circulated through the cooling scheme 64 to transfer thermal energy from the component 50 to the airflow 68 thereby cooling the component 50.

In this non-limiting embodiment, the exemplary cooling scheme 64 includes a plurality of cavities 72 that extend inside of the body portion 52. However, the cooling scheme 64 is not necessarily limited to the configuration shown, and it will be appreciated that a greater or fewer number of cavities, including only a single cavity, may be defined inside of the body portion 52. The cavities 72 communicate the airflow 68 through the cooling scheme 64, such as along a serpentine or linear path, to cool the body portion 52.

Ribs 74 may extend between the first side wall 58 and the second side wall 60 of the body portion 52. The ribs 74 may also radially extend across a span of the body portion 52.

The exemplary cooling scheme 64 may additionally include one or more vascular engineered lattice structures 80 that are disposed inside sections of the body portion 52 of the component 50. For example, discrete portions of the component 50 may embody a vascular engineered lattice structure, or the entire component 50 can be constructed of a vascular engineered lattice structure. Multiple embodiments of such vascular engineered lattice structures are described in detail below.

Figure 3:
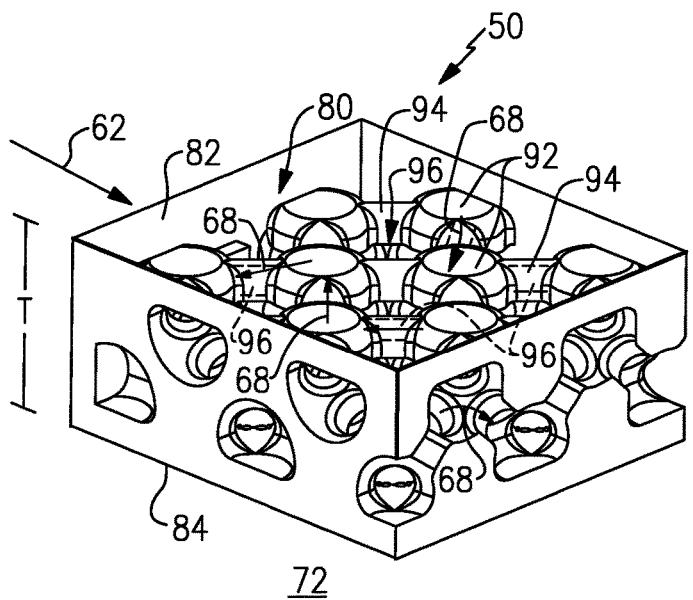
FIG. 3 shows one exemplary engineered vascular structure of a gas turbine engine component.
Figure 4:
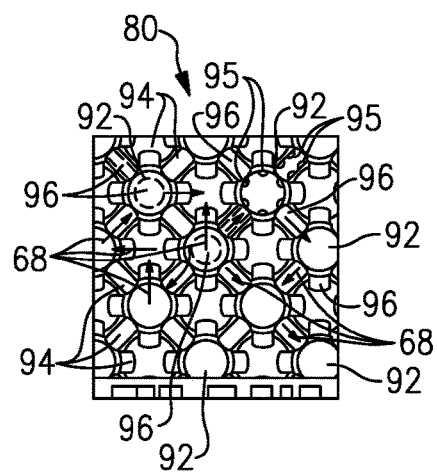
FIG. 4 illustrates another view of the engineered vascular structure of FIG. 3.

FIGS. 3 and 4 illustrate one exemplary vascular engineered lattice structure 80 that can be incorporated into a component 50. The vascular engineered lattice structure 80 may be incorporated into any section or sections of a gas turbine engine component. In this disclosure, the term "vascular engineered lattice structure" denotes a structure of known surface and flow areas that includes a specific structural integrity.

As discussed in greater detail below, the vascular engineered lattice structure 80 of FIGS. 3 and 4 is a hollow vascular structure. The hollow vascular structure shown in FIGS. 3 and 4 defines a solid material with discrete, interconnected cooling passages that are connected through common nodes to control the flow of airflow throughout the hollow vascular structure.

The specific design and configuration of the vascular engineered lattice structure 80 of FIG. 3 is not intended to be limited to only the configuration shown. It will be appreciated that because the vascular engineered lattice structure 80 is an engineered structure, the vascular arrangement of these structures can be tailored to the specific cooling and structural needs of any given gas turbine engine component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, film effectiveness, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first wall 82 and a second wall 84 of the component 50. The first wall 82 is spaced from the second wall 84. The first wall 82 may be exposed to the gas path 62, whereas the second wall 84 may be remotely positioned from the gas path 62. For example, the second wall 84 could face into one of the cooling source cavities 72 of the cooling scheme 64 (see FIG. 2). The vascular engineered lattice structure 80 includes a thickness T between the first wall 82 and the second wall 84. The thickness T can be of any dimension.

Airflow 68 migrates through the vascular engineered lattice structure 80 to convectively cool the component 50. In this embodiment, the vascular engineered lattice structure 80 embodies a hollow configuration in which the airflow 68 may be circulated inside of the various passages defined by the vascular engineered lattice structure 80. For example, the hollow configuration of the vascular engineered lattice structure 80 may establish a porous flow area for the circulation of airflow 68. Additionally, airflow 68 could be communicated over and around the vascular engineered lattice structure 80.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a molybdenum based Refractory Metal Core (RMC) that can be used to cast the vascular engineered lattice structure 80. In one embodiment, the additive manufacturing process includes utilizing a powder bed technology for direct fabrication of airfoil lattice geometry features, while in another embodiment, the additive manufacturing process can be used to produce "core" geometry features which can then be integrated and utilized directly in the investment casting process using a lost wax process.

The exemplary vascular engineered lattice structure 80 includes a plurality of nodes 92, a plurality of branches 94 that extend between the nodes 92, and a plurality of hollow passages 96 between the branches 94 and the nodes 92. The number, size and distribution of nodes 92, branches 94 and hollow passages 96 can vary from the specific configuration shown. In other words, the configuration illustrated by FIG. 4 is but one possible design.

The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

In this "hollow lattice" structure configuration, airflow 68 can be circulated inside hollow passages 96 of the nodes 92 and the branches 94 to cool the component 50 in the space between the walls 82, 84 (see FIG. 3). For example, the "hollow" lattice structure may include multiple continuous hollow spoke cavity passages 96 thru which airflow 68 is passed. The airflow 68 flows from each of the hollow branches 94 and coalesces into the nodes 92, which serve as a plenum for the airflow 68 to be redistributed to the next set of hollow branches 94 and nodes 92. The "hollow" lattice structure forms multiple circuitous continuous passages in which the airflow 68 flows to maximize the internal convective cooling surface area and coolant mixing. Additionally, airflow 68 could be communicated over and around the nodes 92 and branches 94 of the vascular engineered lattice structure 80.

The nodes 92 and the branches 94 additionally act as structural members that can be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In one embodiment, one or more of the nodes 92 and branches 94 may include augmentation features 95 (shown schematically in FIG. 4) that augment the heat transfer effect of the airflow 68 as it is communicated through the vascular engineered lattice structure 80. The augmentation features 95 can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and hollow passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

Figure 5:
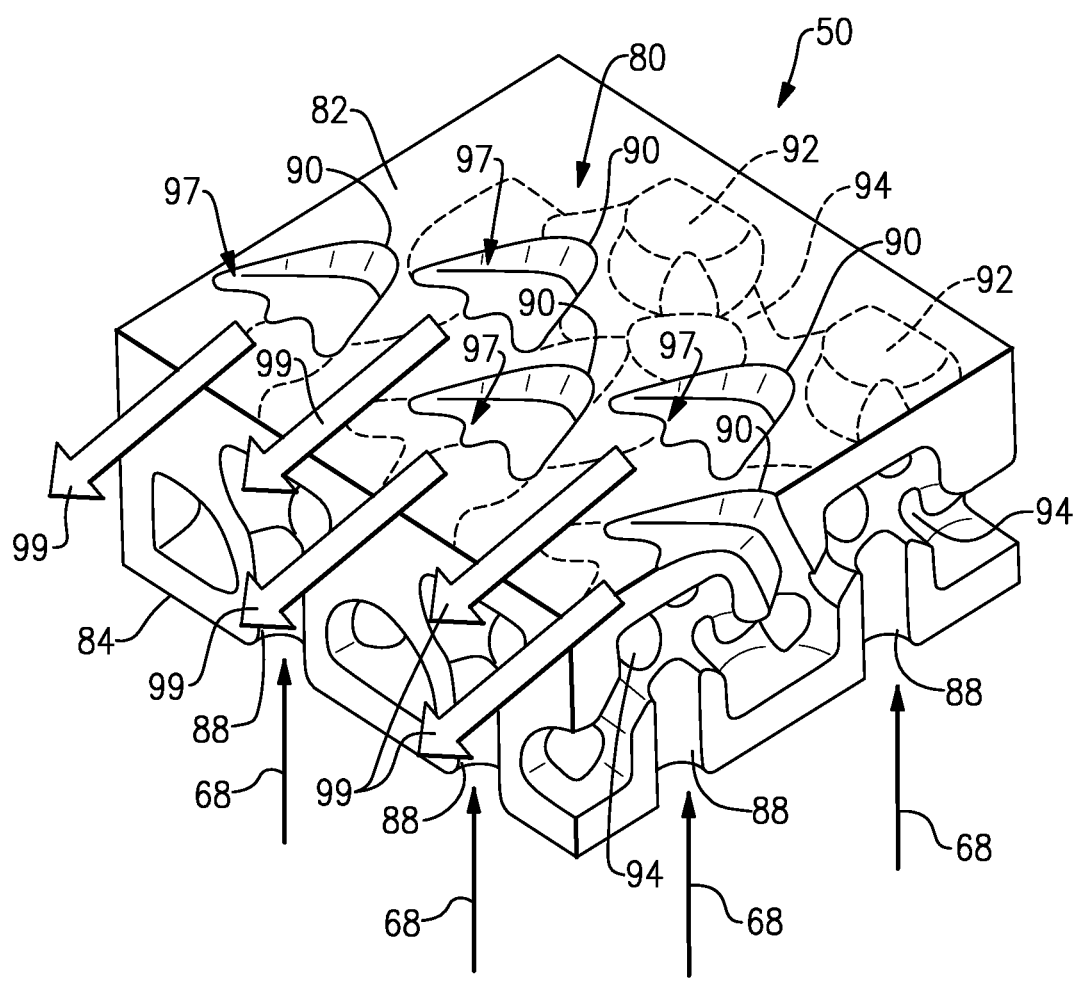
FIG. 5 shows additional features of an engineered vascular structure.

Referring to FIG. 5, the vascular engineered lattice structure 80 can include one or more inlet holes 88 and outlet holes 90. In this embodiment, the inlet holes 88 extend through the second wall 84 and connect the vascular engineered lattice structure 80 to a cavity 72 of the component 50, and the outlet holes 90 are disposed at the first wall 82. Airflow 68 may be extracted from the cavity 72 as resupply air that is communicated through the inlet holes 88 and into the nodes 92 and branches 94 of the vascular engineered lattice structure 80. The airflow 68 may be circulated through the various nodes 92 and branches 94 to convectively cool the component 50. The airflow 68 may exit the vascular engineered lattice structure 80 through the outlet holes 90 as film cooling air 99.

Although multiple inlet holes 88 and outlet holes 90 are depicted, any number of such holes can be incorporated into the vascular engineered lattice structure 80. In this embodiment, the inlet holes 88 are round shaped and the outlet holes 90 are film cooling holes having multi-lobed diffusion sections 97. The geometry and shape of the inlet and outlet holes 88, 90 could embody other geometries and shapes within the scope of this disclosure. Film hole geometries of any shape can be manufactured in order to provide the necessary adiabatic film effectiveness and can include but are not limited to round, conical, cone, diffused shaped, multi-lobed and/or slot film cooling geometries. Moreover, the holes 88, 90 can be manufactured using an additive manufacturing process, including but not limited to, DMLS, EBM, SLS and SLM.

Figure 6:
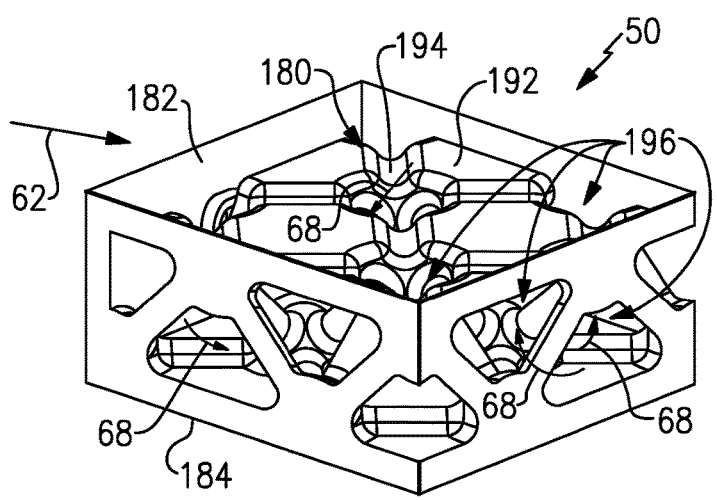
FIG. 6 illustrates another exemplary engineered vascular structure.
Figure 7:
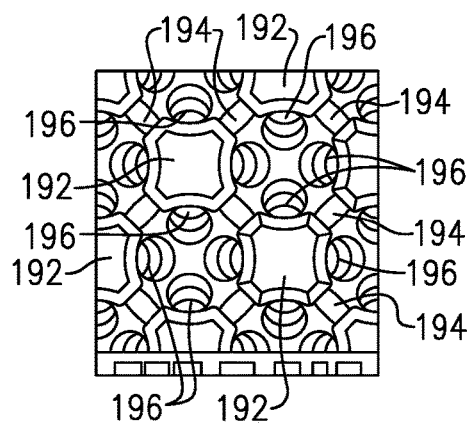
FIG. 7 illustrates another view of the engineered vascular structure of FIG. 6.

FIGS. 6 and 7 illustrate another exemplary vascular engineered lattice structure 180. In this embodiment, the vascular engineered lattice structure 180 embodies a solid lattice structure in which airflow is communicated over and around the solid lattice structure thereby governing flow and providing structural support. The vascular engineered lattice structure 180 is disposed between a first wall 182 and a second wall 184 of the component 50.

The vascular engineered lattice structure 180 includes a plurality of nodes 192, a plurality of branches 194 that extend between the nodes 92, and a plurality of open passages 196 between the branches 194 and the nodes 192. The nodes 192, branches 194 and open passages 196 can be manufactured as a single contiguous structure made of the same material.

In this "solid" lattice structure configuration, airflow 68 can be circulated through the open passages 196 to cool the component 50 in the space between the walls 182, 184. In other words, in contrast to the hollow lattice structure embodiment which communicates airflow through the insides of the nodes 192 and branches 194, the airflow 68 is circulated over and around these parts as part of a porous flow area. For example, the "solid" lattice structure includes multiple continuous solid branches 194 over which airflow 68 is passed. The "solid" lattice structure forms circuitous passages for the airflow 68 to traverse around as it migrates through the vascular engineered lattice structure to maximize the convective cooling surface area and coolant mixing around the nodes 192 and the branches 194. The nodes 192 and the branches 194 additionally act as structural members that resist and dampen pressure, rotation forces, and vibratory loads.

The exemplary vascular engineered lattice structure 180 establishes a ratio of cooling area to structural area. The cooling area is established by the open passages 196, while the nodes 192 and branches 194 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

Figure 8:
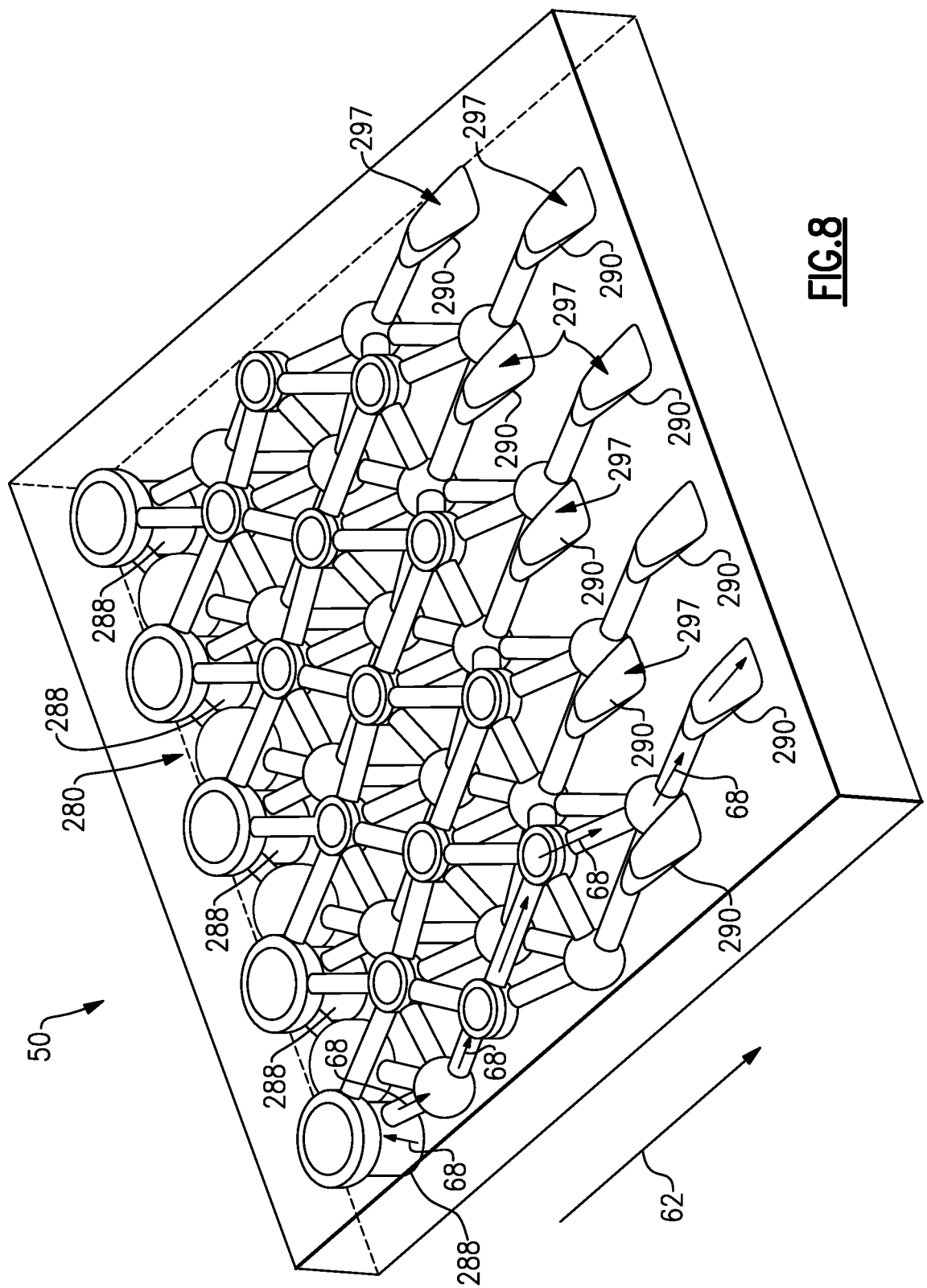
FIG. 8 illustrates another engineered vascular structure embodiment having a co-flow design.

The vascular engineered lattice structures can be configured in either a co-flow or counter-flow heat exchanger design concepts. For example, FIG. 8 depicts a vascular engineered lattice structure 280 providing a co-flow design. In other words, the airflow 68 is circulated through the vascular engineered lattice structure 280 in substantially the same direction as the gas path 62 flow direction. Although a hollow configuration is depicted, a co-flow design could also be incorporated into a "solid" configuration.

This particular vascular engineered lattice structure 280 includes a plurality of inlet holes 288 and a plurality of outlet holes 290. The outlet holes 290 of this embodiment are positioned in staggered rows R1 and R2 and include shaped diffusion sections 297. Of course, a single row of outlet holes 290 could also be utilized. The outlet holes 290 may embody other diffusion shapes and geometries than are shown.

Figure 9:
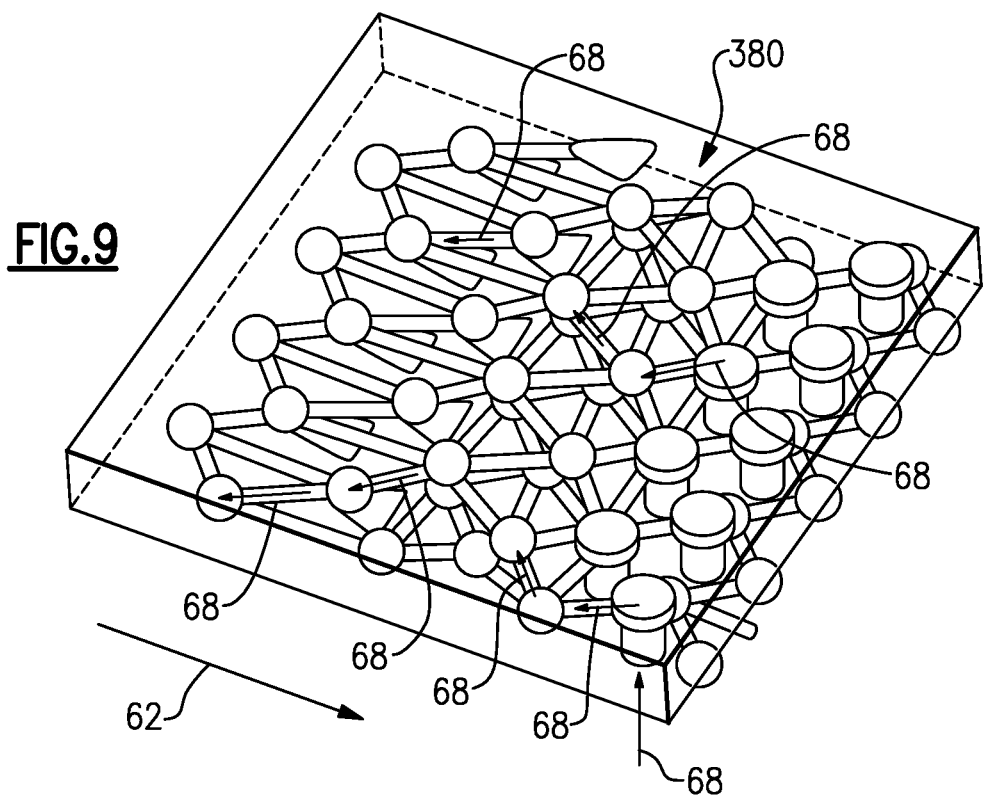
FIG. 9 illustrates another embodiment of an engineered vascular structure embodying a counter-flow design.

FIG. 9 illustrates yet another exemplary vascular engineered lattice structure 380 that could be incorporated into a gas turbine engine component. In this embodiment, the vascular engineered lattice structure 380 provides a counter-flow design. In other words, the airflow 68 is circulated through the vascular engineered lattice structure 380 in a direction that is generally opposite to the flow direction of the gas path 62.

Figure 10:
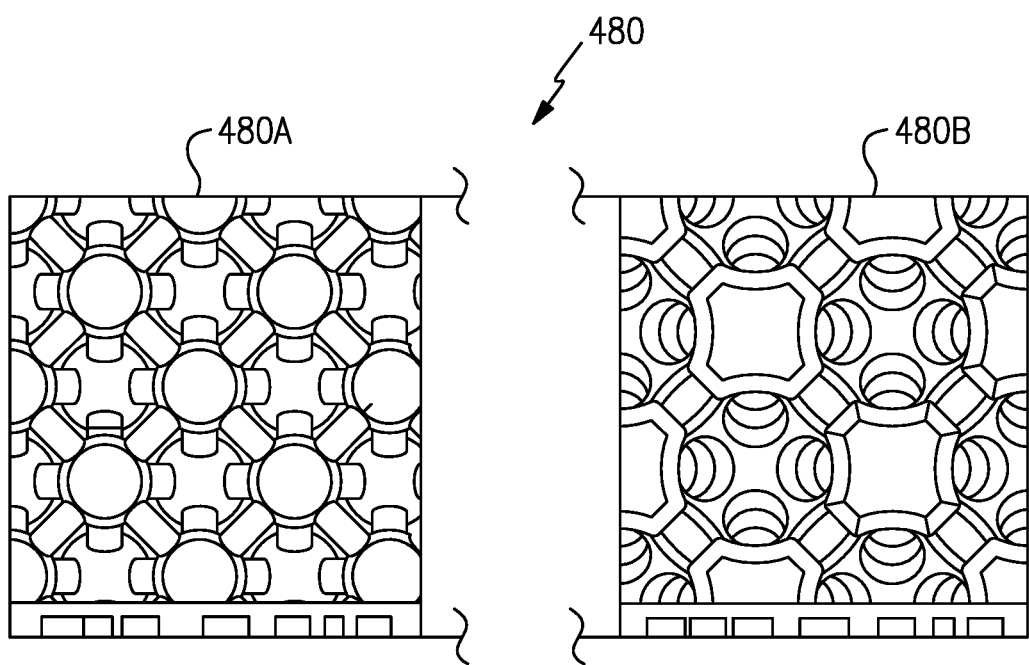
FIG. 10 illustrates yet another exemplary vascular engineered lattice structure.

FIG. 10 illustrates yet another exemplary vascular engineered lattice structure 480 that could be incorporated into a gas turbine engine component. In this embodiment, the vascular engineered lattice structure 480 includes a first portion 480A that can include a hollow lattice structure and a second portion 480B that can include a solid lattice structure. The distribution and interchangeability of the hollow and solid lattice structures is dependent on design requirements and other considerations.

The exemplary vascular engineered lattice structures described in this disclosure may be incorporated into any relatively high heat load gas turbine engine applications where both convective and film cooling is desired. Among other possible design configurations, the vascular engineered lattice structures of this disclosure may be implemented as a co-flow or counter-flow configurations and may either include or exclude airflow resupply to more efficiently provide localized convective cooling and film cooling to achieve extended component operating life.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for producing a component for a gas turbine engine, comprising the steps of:
    forming a vascular engineered lattice structure formed inside of a wall of the component, with a lattice cavity defined between internal surfaces of said wall and external surfaces of said vascular engineered lattice structure, said vascular engineered lattice structure defining a hollow vascular structure configured to communicate a fluid through said vascular engineered lattice structure, said hollow vascular structure defined by a plurality of nodes and a plurality of branches each extending from at least one of said plurality of nodes, with respective internal passages defined within each node of said plurality of nodes and within each branch of said plurality of branches for communicating fluid, said internal passages being distinct from said lattice cavity; and
    said vascular engineered lattice structure having at least one inlet hole and at least one outlet hole that communicate the fluid into and out of said hollow vascular structure.

2. The method as recited in claim 1, wherein said one or more nodes and branches are uniformly distributed throughout said vascular engineered lattice structure.

3. The method as recited in claim 1, wherein said one or more nodes and branches are non-uniformly distributed throughout said vascular engineered lattice structure.

4. The method as recited in claim 1, wherein said vascular engineered lattice structure is a co-flow vascular engineered lattice structure relative to a general direction of flow in a gas path bounded by exterior surfaces of said component adjacent said at least one outlet hole.

5. The method as recited in claim 1, wherein said vascular engineered lattice structure is a counter-flow vascular engineered lattice structure relative to a general direction of flow in a gas path bounded by exterior surfaces of said component adjacent said at least one outlet hole.

6. The method as recited in claim 1, wherein said outlet hole is a film cooling hole.

7. The method as recited in claim 1, wherein said wall is part of a blade, a vane, a blade outer air seal (BOAS), a combustor panel or a turbine exhaust case liner of a gas turbine engine.

8. The method as recited in claim 1, wherein said at least one inlet hole includes a different shape and geometry from said at least one outlet hole.

9. The method as recited in claim 8, wherein the step of forming the vascular engineered lattice structure includes:
forming a core using an additive manufacturing process; and
using the core to cast the vascular engineered lattice structure.

10. The method as recited in claim 8, wherein said wall is part of an airfoil.

11. A component for a gas turbine engine, comprising:
a wall defining exterior surfaces of said component;
a vascular engineered lattice structure formed inside of said wall, and interconnected lattice passages defined between internal surfaces of said wall and external surfaces of said vascular engineered lattice structure, said vascular engineered lattice structure defining a solid vascular structure configured to communicate a fluid through said vascular engineered lattice structure, wherein said solid vascular structure includes a plurality of nodes, a plurality of branches that extend between said plurality of nodes, said lattice passages extending between said plurality of nodes and said plurality of branches, and a plurality of augmentation features that each extend outwardly from a respective one of said plurality of nodes or said plurality of branches;
said vascular engineered lattice structure having at least one inlet hole and at least one outlet hole that communicate the fluid into and out of said solid vascular structure; and
wherein said wall is part of a combustor panel of a gas turbine engine.

12. The component as recited in claim 11, wherein said plurality of branches are orthogonal to said plurality of nodes.

13. The component as recited in claim 11, wherein said plurality of branches are non-orthogonal to said plurality of nodes.

14. The component as recited in claim 11, wherein said at least one outlet hole includes a film cooling hole.

15. The component as recited in claim 14, wherein said plurality of nodes and said plurality of branches are arranged such that fluid is communicated in said lattice passages around and over said plurality of nodes and said plurality of branches.

16. The component as recited in claim 15, wherein said vascular engineered lattice structure is a counter-flow vascular engineered lattice structure relative to a general direction of flow of a gas path bounded by said exterior surfaces adjacent said at least one outlet hole.

17. The component as recited in claim 15, wherein said vascular engineered lattice structure is a co-flow vascular engineered lattice structure relative to a general direction of flow of a gas path bounded by said exterior surfaces adjacent said at least one outlet hole.

18. The component as recited in claim 15, wherein said at least one inlet hole includes a different shape and geometry from said at least one outlet hole.

19. The component as recited in claim 18, wherein said film cooling hole has a multi-lobed diffusion section.

20. A method for producing a component for a gas turbine engine, comprising the steps of:
forming a vascular engineered lattice structure inside of a wall of the component, said vascular engineered lattice structure having a hollow lattice structure and a solid lattice structure and including at least one inlet hole and at least one outlet hole that communicate a fluid into and out of said vascular engineered lattice structure;
a lattice cavity is defined between internal surfaces of said wall and external surfaces of said vascular engineered lattice structure; and
each of said hollow lattice structure and said solid lattice structure is defined by a plurality of nodes and a plurality of branches each extending from at least one of said plurality of nodes, with at least some of said plurality of branches being spaced apart from internal surfaces of said wall defining said lattice cavity such that fluid is communicated in said lattice cavity around and over said plurality of nodes and said plurality of branches.

21. The method as recited in claim 20, wherein the step of forming the vascular engineered lattice structure includes:
forming a core using an additive manufacturing process; and
using the core to cast the vascular engineered lattice structure.

22. The method as recited in claim 21, wherein said at least one inlet hole includes a different shape and geometry from said at least one outlet hole.

* * * * *